UNITED STATES PATENT OFFICE.

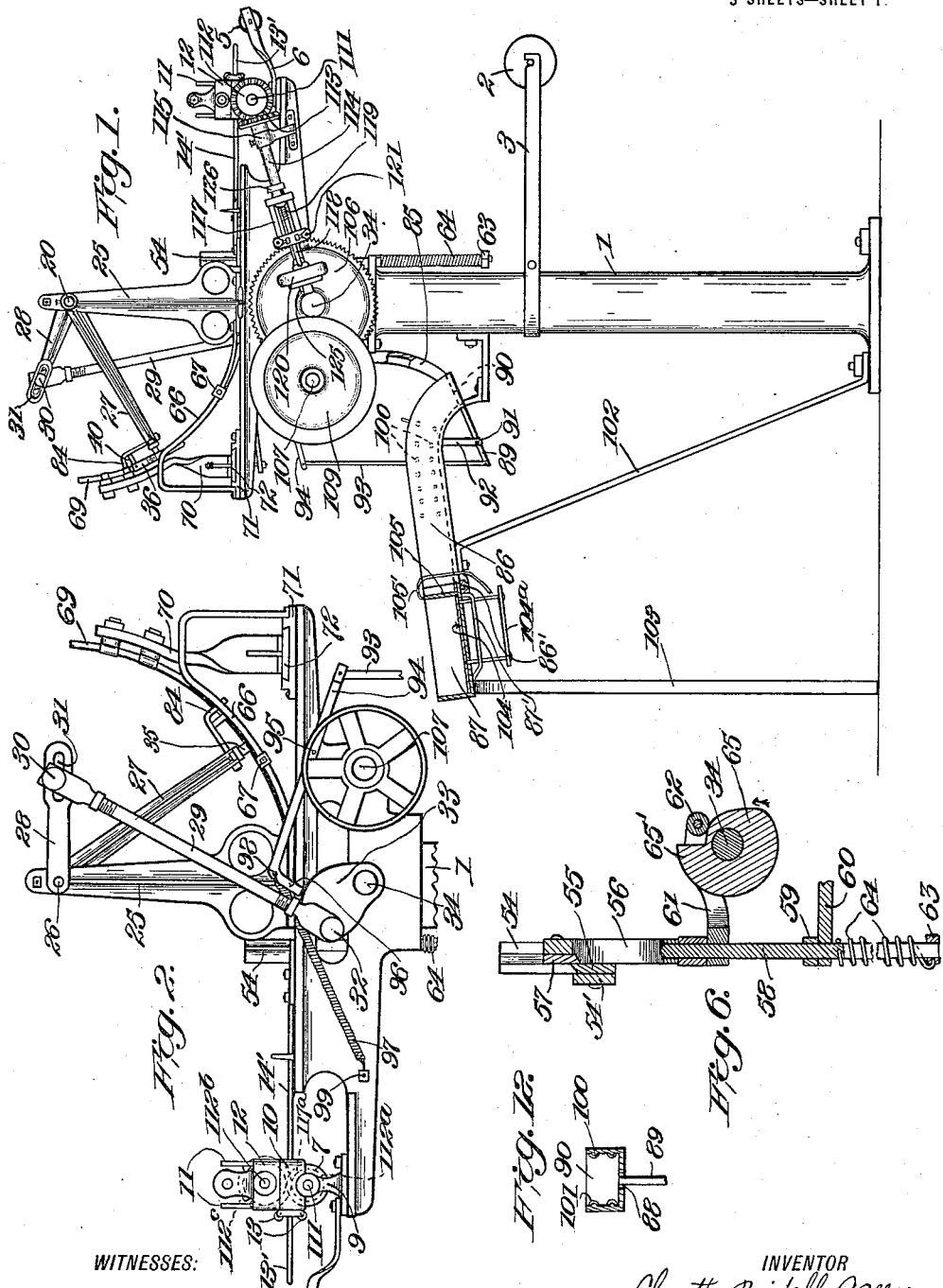

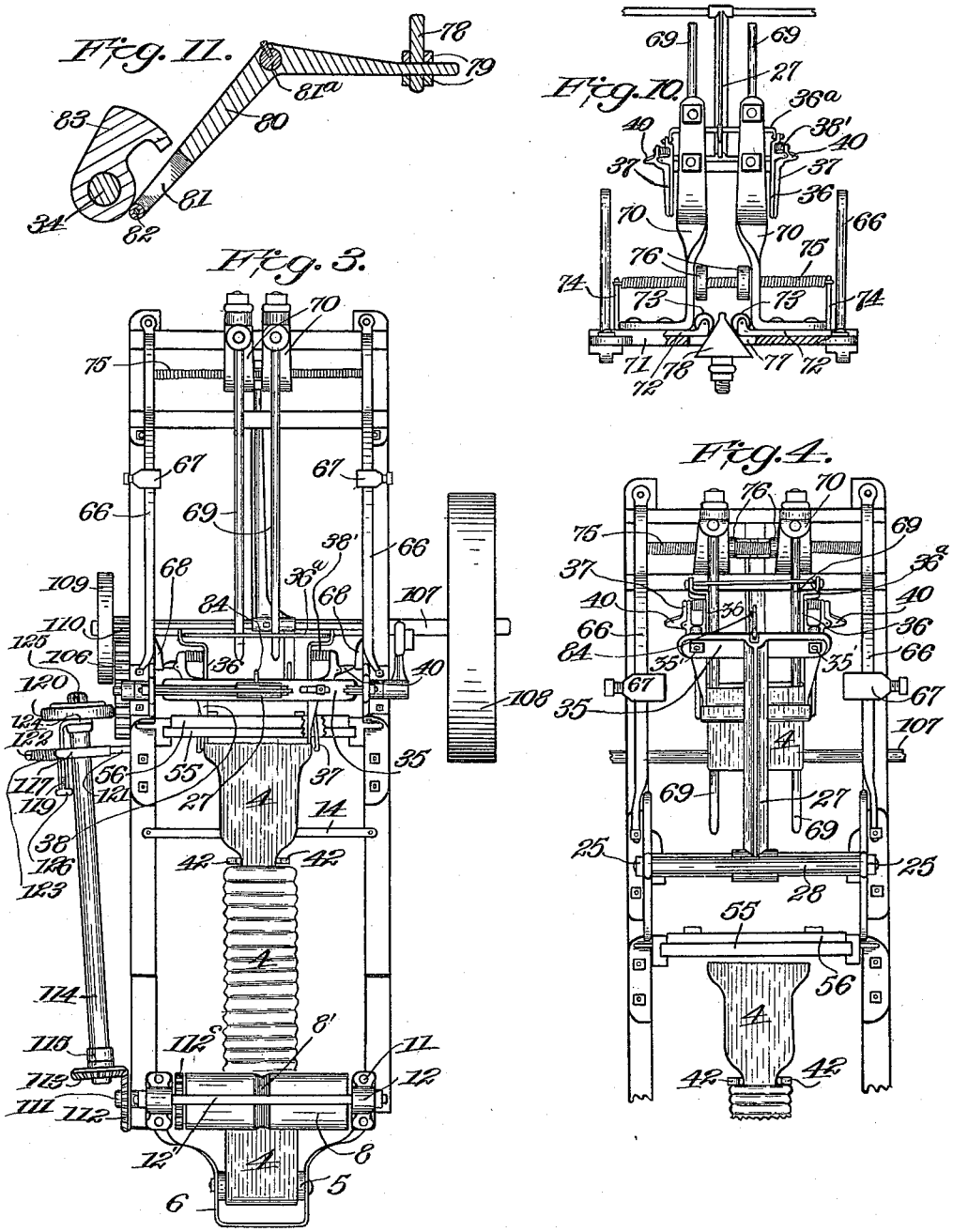

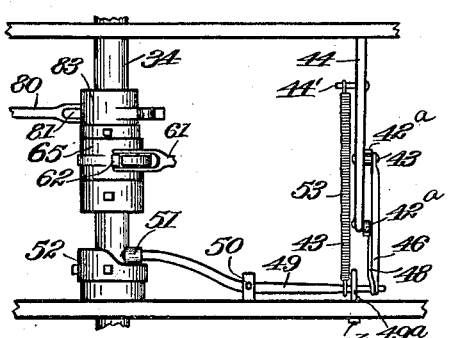
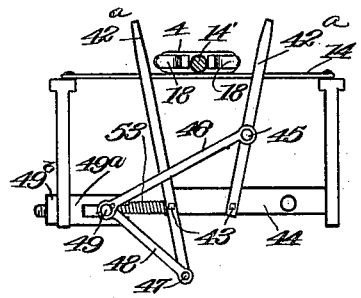
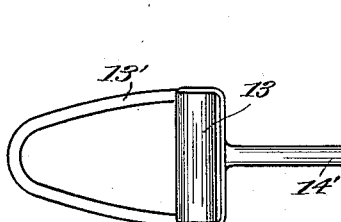
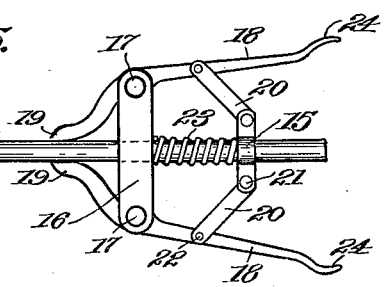

CLARETT BIRDELL GREESON, OF FAIRFIELD, IOWA, ASSIGNOR TO FRED L. HUNT, OF FAIRFIELD, IOWA.

MACHINE FOR CUTTING AND FOLDING CLOTH TUBING.

1,154,581. Specification of Letters Patent. Patented Sept. 21, 1915.

Application filed December 18, 1912. Serial No. 737,548.

*To all whom it may concern:*

Be it known that I, CLARETT BIRDELL GREESON, a citizen of the United States, residing at Fairfield, in the county of Jefferson and State of Iowa, have invented new and useful Improvements in Machines for Cutting and Folding Cloth Tubing, of which the following is a specification.

My invention relates to a machine or mechanism for cutting cloth into lengths and turning and folding the same into suitable shape, and more specifically to a machine for cutting cloth in the form of tubing into lengths, and turning and folding the same upon itself so as to be double and serve as cuffs to be attached to garments.

The main objects of the invention are to provide a machine of this kind that will effect the desired function of cutting, turning, and folding the tubing into cuffs with despatch; to provide a machine of this kind that will be strong, durable, and highly efficient in operation, and to provide a machine of this kind that employs a minimum number of parts so that the same may be manufactured at minimum cost.

Various other objects in connection with those mentioned, are attained by the provision of the machine which will appear from the description following taken in connection with drawings accompanying this application.

In these drawings, the form of the machine as preferred and as now manufactured is shown, and comprises various groups of correlative, dependent devices or mechanisms accomplishing the function stated, which mechanisms described briefly are the tubing feeding mechanism; the tubing-spreading and gripping device; the tubing advancing mechanism; the mechanism to release the tubing-spreading mechanism; the cutting mechanism; the means for operating the tubing gripping devices; the mechanism for gripping and holding the cut lengths of tubing; the means for spreading and retracting the gripper rods for the cut lengths of tubing; the discharge mechanism and the driving mechanism. In describing such mechanisms, it is obvious of course, that description will be found under each heading which relates to other mechanisms, but which is necessary to there set forth in order to enable the construction and operation of the allied parts of the machine to be better and clearly comprehended.

Briefly describing the various views of the drawings, Figure 1 is a side elevation; Fig. 2 is a side elevation of the upper parts of Fig. 1 looking from the reverse side; Fig. 3 is a plan view; Fig. 4 is a plan view partly broken away, showing one of the cut lengths of tubing in the process of being folded into a cuff; Fig. 5 is a plan view of the tubing-spreading and gripping device over which the tubing passes after leaving the feed rollers; Fig. 6 is a vertical sectional view illustrating the knives or cutter mechanism employed; Fig. 7 is a detail side elevation of one of the gripping and conveying devices for the tubing; Fig. 8 is a plan view illustrating the driving parts on the main shaft of the machine and the mechanism for acting upon the tubing-spreading and gripping fingers to release the tubing; Fig. 9 is an elevation of the latter mechanism. Fig. 10 is a fragmentary view in elevation illustrating the means for actuating the gripping and holding means for the cut lengths of tubing; Fig. 11 is a detail sectional view illustrating the cam drive and the wedge member for actuating the gripping and holding members for the cut lengths of tubing, actuated by the cam drive, and; Fig. 12 is a detail vertical sectional view illustrating the trough and paddle mechanism operating therein.

Referring generally to the machine, the operating parts and mechanisms are mounted upon a suitable frame supported as by means of a standard 1. It is clear that the frame is constructed so as to effectively permit the attachment of the various mechanisms to be described, and to permit the operation thereof. The material to be fed, which as shown is cloth in the form of tubing, is supplied from a roll 2, removably, loosely and rotatably mounted in arms or brackets 3 suitably connected to the standard 1. In the drawings, the tubing is designated 4 but has been omitted in Fig. 1 for the sake of clearness.

*The tubing feeding mechanism.*—The tubing 4 passes from the roll 2 up over a roller 5 which is mounted in suitable brackets 6 fastened to the frame of the machine. After passing from the roll 5, the tubing passes between feed rollers 7 and 8. The roller 7 is rotatably mounted in a bracket 9 fastened to the frame of the machine. Said bracket 9 has a head 10 thereon from which projects upwardly, pins or rods designated 11. Numeral 12 designates a removable bracket or head which is provided with openings through which pass the rods 11, and by means of which connection the bracket is removably connected to the head 10. The bracket 12 comprises opposite heads which are connected by a handle rod designated 12', and best seen in Fig. 3. The roller 8 is rotatably mounted in the removable bracket 12. The bracket 12 and head 10 directly abut but the rollers 7 and 8 are prevented from direct engagement by the tubing 4 passing between the same. Each roller 7 and 8 is grooved at 8' for the purpose to appear hereinafter.

*The tubing-spreading and gripping device.*—This device is shown in detail in Fig. 5. On this device is preferably provided rollers 13 which bear against the rollers 7 and 8 and thereby prevent the passage of said device between the rollers 7 and 8. Across the frame of the machine and beneath the forward end of said device, is provided a suitable support for this device shown in the form of a transverse bar 14. It is to be understood that this spreading and gripping device is not positively fastened to any part, but merely rests between the feed rolls and on bar 14, being held against displacement by the engagement of the rollers 13 with the head 10 and bracket 12. By reason of the fact that the bracket 12 is removable, the same may be removed to facilitate the passage of the tubing over the spreading device, and to facilitate the insertion of the spreading device intermediate said rollers 7 and 8. The cloth tubing passes over and completely incloses the spreading and gripping device, as best seen in Figs. 3 and 4. Of said device 13' designates a curved guide rod or wire to assist in initially spreading the tubing and 14' designates a rod to which is slidably fastened a bracket 15, and rigidly fastened a connecting bar 16. Said rod 14' is located in the grooves 8' of the rollers 7 and 8. To the bar 16 is pivoted at 17 on opposite sides of the rod, tubing engaging fingers 18, one end of which designated 19, bears against the rod. Links 20 are pivotally connected to the bracket 15 at 21, and to the fingers at 22. Surrounding the rod 14' intermediate and bearing against the bar 16 and bracket 15, is a coil spring 23 exerting pressure against the bracket 15 to force the same away from the bar 16 and thereby draw the tubing engaging ends of the fingers which may be designated 24, closer to the rod 14'.

By reason of the provision of a rod such as 14' or of another part of slight width, the tubing is permitted to accumulate along such rod portion 14', as may be best seen in Fig. 3, after a length thereof has been cut by means to be later referred to, and preparatory to the remainder of the tubing being gripped and carried forward beneath such cutting means.

*The tubing advancing mechanism.*—As best seen in Figs. 1 and 2, 25 are standards which rise from the bed or frame of the machine, in which at their upper ends is journaled a shaft 26 to which is rigidly fastened an arm 27 and also rigidly fastened a crank arm 28. Said crank arm 28 is connected to a pitman 29 by means of a pin 30 on the pitman, passing through an elongated slot 31 in the crank arm. The pitman 29 is connected at 32 to a cam 33 mounted on and to rotate with a driven shaft of the machine which is designated 34. Said arm 27 by the connection described, will oscillate upon the rotation of shaft 34. Said arm 27 is T-shaped at one end through the provision of transverse arms 35.

On the arms 35 is mounted a pair of similar tubing gripping devices, one of which is shown in detail in Fig. 7. These gripping devices are so located on the arms that they engage the tubing adjacent opposite edges thereof. Of this device 36 designates a finger which is fixed to the arms 35, and 37 designates a finger which is pivoted on the arms 35 as by means of bolts 35'. The fingers 36 are preferably connected and braced by a transverse rod or bar 36$^a$, connected or fastened to the fixed fingers 36 at a part 36$^b$ thereof. The pivoted finger as shown, is raised at its rear end and intermediate the same and finger 36 is interposed a coil spring 38' which exerts tension to maintain the fingers normally in closed relation. At the forward end of finger 37 is provided a pin 39 which is adapted to enter a somewhat enlarged hole or slot in the end of the finger 36, as shown in Fig. 7. On the finger 37 is provided a lug 38 to which is pivoted at 39' a stud member 40 having an angle arm 41 normally resting against the raised part of said pivoted finger. A coil spring 42 preferably connected to the arm 41 of stud 40 and to the finger 37, is provided to normally maintain the arm 41 against the raised arm of finger 37, as shown in Fig. 7. After the tubing passes over the spreading device, during the engagement of stud 40 with means hereafter to be described, the fingers 36 and 37 are opened so that the fixed fingers 36 will be free to extend into the tubing for a predetermined distance. Thereupon the lug 40 is disengaged from such means and the spring 38' returns the finger 37 into closed relation with finger 36; the pin 39 and its hole or slot providing means to more effectively engage or grip the tubing. It is clear that during the swinging or oscillation of arm 27 that the tubing is carried or pulled forward by the engagement of the gripping devices therewith.

*Mechanism to release the tubing-spreading mechanism.*—In order to spread the tubing to the proper width and actuate fingers 18 so that the ends 24 will position the tubing and themselves be in proper lateral position to permit the gripping means of arm 27 to reach under and beyond the movable knife to be hereinafter described to grip the tubing, the following means is provided: Numerals 42ª designate arms or levers which are pivoted at 43 to a bar 44 secured to the frame of the machine. To one of the levers 42ª is pivoted at 45 a link 46, and to the other of said levers is pivoted at 47 a link 48. Said links 46 and 48 are pivoted to one end of a lever 49 in turn pivoted at 50 to a stud or bracket provided on the frame of the machine. A guide bracket for the lever 49, which is designated 49ª is removably bolted to the frame of the machine as at 49ᵇ. Said guide as shown, is provided with an elongated opening in which the lever 49 slides laterally. Said lever at one end, is provided with a roller 51 which is adapted to follow the surface of a cam 52 provided on the driven shaft 34 so as to throw the levers 42ª into position to engage ends 19 of fingers 18. A coil spring 53 is connected to the lever 49 and to the bar 44 at 44', and serves to normally maintain said levers 42ª spread apart. The levers 42ª are maintained spread apart and out of the path of ends 24 of fingers 18 by the spring 53 except just before the fingers or gripping means on arm 27 take hold of the tubing, at which time cam 52 shifts the lever 49 and closes the fingers 42ª or moves them closer together and in position so that they will bear against the ends 19 of fingers 18 to spread the fingers within the tubing and accordingly spread the tubing to practically its limit whereby the tubing will be effectively gripped. Immediately upon the tubing being gripped by the fingers or gripping means of arm 27, the roller 51 of the lever 49 rolls off the projection of cam 52 whereby the levers 42ª spread to normal position, thereby disengaging ends 19 and fingers 18, releasing the tubing so that the same can be freely drawn over the tube spreading and gripping device. It is clear of course, that the tubing is located intermediate the levers 42 and ends 19 of fingers 18. Said gripping devices draw the tubing across suitable cutter means, now to be described.

*The cutting mechanism.*—This mechanism is best seen in Fig. 6. On the frame of the machine at opposite sides thereof, are fastened vertical plates or brackets 54, and a casting or frame 54' to which is fastened a stationary cutter or knife 55. In the brackets 54 slides vertically a casting or frame 56, substantially of D-shape, so as to be open at its center to permit the passage of the tubing therethrough. On said frame is fastened a knife or cutter 57. This frame and knife may be designated a movable cutter member. To the frame 56 is fastened a rod 58 on which is secured rigidly, a lug or collar 59 which is adapted to limit the downward movement of the frame 56 by engagement with a suitable part of the machine designated 60 for convenience. It will be seen that the shock incidental to the descent of the movable cutter member, is taken up by the collar 59. Connected to the rod 58 is a yoke or fork 61, between and to the arms of which is pivoted a roller 62. On the driven shaft 34 is mounted a cam 65 with which the roller 62 operatively engages. Below the part 60 and surrounding the rod and bearing against the part 60 and a nut 63 on the rod 58 is a coil return spring 64. The movable knife or cutter member is intermittently moved relative to and slightly past the cutter 55 to sever the tubing into lengths through the engagement of the cam 65 with the roller 62. It will be seen that there is quite a fall or distance between the outermost point of cam 65, which may be designated 65', and the innermost point of said cam, and that the roller 62 has considerable distance to travel or fall after the part 65' has passed the same. When the roller is on point 65', the spring 64 is expanded and when the roller falls off such point, the spring contracts and positively draws the movable cutter device downwardly so that the cutters rapidly and effectively cut or sever the tubing into lengths.

*Means for operating the tubing gripping devices.*—Suitable curved bars 66 are fastened upon the frame of the machine at opposite sides thereof, and on said bars are provided lugs 67 and 68. These lugs 67 and 68 are rigidly fastened but adjustably on said bars and are located in the path of the pivoted stud 40. The fingers 36 and 37 open only upon the downward swing or oscillation of arm 27, and the gripping of the tubing is effected when such arm is close to the end of its downward stroke. At such time the stud 40 engages against the lugs 68, thereby opening the fingers, which during the further downward movement of the arm 27 passes into the tubing, and after passage of the studs past such lugs 68, the spring 38' returns the fingers to closed position, it being clear that the fingers 36 extend interior of the tubing, and the fingers 37 exterior of the tubing, and the cloth accordingly gripped between the same. It is also clear that upon the reverse swing of arm 27, that the gripping devices will pull the cloth forward. These fingers are shown in partly open position in Fig. 3. After closing of the fingers on the tubing, the reverse movement of arm 27 occurs, and during the movement of studs 40 past the lugs 68 on the upward movement, by reason of the pivotal and spring mounting of the studs 40, the same will yield so as not to disturb the closed relation of fingers 36 and 37. At the start of the downward swing of the arm 27, the studs 40 act against the lugs 67, which opens the fingers for a purpose that will presently appear.

*Mechanism for gripping and holding cut lengths of tubing.*—When the fingers 36 and 37 of arm 27 have passed between the knives and gripped the tubing, immediately levers 42 recede so that the ends 24 disengage the tubing so that the gripped tubing is easily and freely drawn over gripping and spreading or holder rods 69. To effectively engage the cloth tubing and hold the same against accidental slipping, the cloth engaging surfaces of said rods are preferably coated with emery dust or emery in granulated form, secured to the rods by means of shellac or the equivalent. The cut length of tubing, prior to being cut, is started on its passage on the rods 69, said rods extending into and through said tubing. During the upward movement of the arm 27, the gripping devices carry or move the cut lengths up said arms. Until the arm 27 has reached its uppermost position, the rods 69 are relatively close together, as shown in Fig. 3, so that the tubing will easily slip thereover. Immediately upon the uppermost position being reached, the rods 69 are spread or forced outwardly by suitable means to the position best shown in Fig. 4.

*Means for spreading and retracting the gripper rods for the cut lengths of tubing.*—This means is best shown in Figs. 10 and 11. The rods are fastened in any suitable manner to sliding brackets 70 mounted upon the frame of the machine as follows. Numeral 71 designates a guide plate which is fastened to the frame of the machine, and which is provided with a groove dovetail in cross section, as best seen in Fig. 2. Each bracket is riveted or otherwise secured to an arm or block 72 dove-tail in cross section and slidable in the dove-tail grooves of plate 71. Suitably mounted on each block 72 is a roller 73 and rising from the said blocks are posts 74 to which is attached a coil spring 75 which extends through the brackets 70 and is so connected thereto as to return such brackets to their normal or relatively closed position shown in Fig. 10. On the spring 75 are provided bumpers 76 preferably in the form of rubber disks, against which the brackets 70 abut on return movement to normal position. In the plate 71 is provided an enlarged opening 77 through which extends a wedge or bracket shifting member 78. This member 78 is provided with a screw threaded shank and bolted by nuts 79 to an arm of a wedge operating lever 80. The lever 80 is pivoted upon a shaft 81ª mounted in the machine. One arm of the lever 80 is forked at 81, and between the forks or arms is pivoted a roller 82 which operates in connection with a cam 83 which is mounted upon the shaft 84 of the machine. During the actuation of the cam 83, the lever is tilted so that the wedge 78 is moved relatively to the rollers, and its inclined faces will bear against such rollers and shift or spread the same apart, and accordingly shift and spread apart the rods 69 so that they will tightly grip and hold the cut lengths of tubing. These rods 69 it is to be understood, are actuated or spread simultaneously with the arm 27 reaching the limit of its upward swing. On the return or downward stroke of the arm 27, the gripping devices remain closed and turn the cut length of tubing and return or fold the same from the upper end of such length over and against the remainder of such cut length, until both ends thereof are even and the cut length double, so as to form a cuff. Immediately upon the ends of the cut length becoming even and the cuff thus folded or formed, the studs 40 will contact with the lugs 67, whereby the finger 37 will be moved away from the finger 36 to thereby release the cuff. Immediately upon the studs 40 passing the lugs 67, the springs 38′ will return the fingers 36 and 37 to closed relation. Extending from the arm 27 at one end on opposite sides thereof are arms 35 through which the bolts 35′ pass. From the arm 27 midway of the arm 35 extends an arm provided with a crook 84, which last arm extends intermediate the rods 69 and below the plane of the upper face of said rods 69. Simultaneously with the release of the cuff from fingers 36 and 37, the rods 69 are restored or returned to their normal position, that is in close relation, through the medium of spring 75 as soon as the roller 82 passes over the outermost projection of cam 83, thereupon spring 75 moves blocks 72 toward each other which forces the wedge 78 from between the rollers 73 so that rods 69 can move into close relation.

*The discharge mechanism.*—The cuffs when pushed off the rods 69, fall down a curved or otherwise shaped chute 85. Fastened in operative relation with the chute 85 is a trough 86, at the end of which is removably supported a trough section 87. The bottom of trough 86 at one end thereof, is preferably curved and centrally provided with an elongated slot or opening 88 in which moves a rod 89 having at one end thereof a paddle 90, which paddle is located and operates in the trough 86. The function of this paddle is to receive the cuffs, one at a time, and advance the same through trough 86 to the trough section 87. Such paddle when it receives a cuff, is in the position shown in Fig. 1, where it is at one extremity of the trough 86. In such position, it is clear that the cuff falls down chute 85 and onto such paddle. Means is provided whereby the paddle may be operated to advance or forward the cuff. To this end the rod 89 is pivoted at 91 to a bracket or arm 92 fastened to the trough 86. To the lever 89 is pivotally connected a rod 93, which in turn is pivoted to a lever 94. Lever 94 is pivoted to a suitable part or the frame of the machine, as 95. Said lever at its free end is provided with an angle arm or crook 96, which is held at all times in engagement with the edge of the cam 33, as by means of a coil spring 97 fastened at 98 to the lever 94, and at 99 to the frame of the machine. It is to be noted that during the operation of the machine, as the cuffs fall on the paddle one at a time, the paddle is swung upwardly which advances or forwards the cuff through the trough 86. In some instances the cuffs have a tendency to return with the paddle. To overcome this difficulty lugs or projections 100 are provided interior of the trough 86 and extend from both sides thereof. It will be seen that the paddle will move the cuffs past such projections 100, and that the projections will prevent returning of a cuff with the paddle. To enable the paddle to pass the projections, the same is preferably cut away or notched at 101 so as to clear the projections during its upward movement.

The trough 86 is braced or supported by means of a bar 102 secured thereto and to the standard 1 at the base thereof. As stated, the trough section 87 is removable. At one end the same is removably connected in any suitable manner to the trough 86 as by means of lugs and sockets 86', and at its other end the section 87 rests upon a vertical support 103. In the section 87 is provided a false bottom member 104, which may be of any suitable construction. The false bottom member 104 has a plurality of rods loosely extending through the bottom of section 87, to which is fastened a handle 104ª. A handle 87' is provided on the bottom of trough 87. The discharge end of trough 86 is open and adjacent said end is slidably and removably mounted a gate 105 in the removable trough 87. To said gate is preferably attached a flexible member such as a cord 105'. Cuffs accumulating in trough 86 are removed therefrom by hand through sliding movement onto the removable section 87, the upper surface of the false bottom 104 and bottom of trough 86' lying in the same plane. After the cuffs have been moved into trough 87, gate 105 is slid in place to close the open end of said trough. Thereupon the section 87 is removed and positioned so that the cuffs will engage the bottom of a receptacle or other part. Thereupon cord 105' and handle 87' are grasped and moved toward the handle 104 so that the sides of trough 87 will free the cuffs. By holding the cord 105' during movement of the trough section, the gate 105 cannot fall out of place. The operator returns the removable trough to its place before cuffs of such quantity as to fall from the trough 86, accumulate in said trough 86.

*The driving mechanism.*—The shaft 34 as has been stated, has mounted thereon several cams which drive various mechanisms as described. On the shaft 34 is mounted a gear wheel 106. The main or driving shaft for the machine is designated 107. This shaft may be driven from any suitable source of power, and as shown, has mounted thereon a pulley 108 adapted to be engaged by a driving belt or the like. On this shaft 107 is mounted a fly wheel 109 and also a pinion or gear wheel 110, whose teeth mesh with the teeth of the gear wheel 106. Thus by rotation of shaft 107 and engagement of the teeth of gears 110 and 106, the shaft 34 will be driven and its cams will accordingly drive the various mechanisms and parts previously described.

Suitable means is provided for positively driving the feed rollers 7 and 8. The shaft of the feed roller 7 is designated 111 and thereon are keyed or otherwise rigidly mounted, a bevel gear wheel 112 and a spur gear wheel 112ª. In mesh with the teeth of the bevel gear wheel 112, are the teeth of a bevel gear wheel 113 carried by a shaft 114 supported loosely by means of a bracket 115, suitably fastened to the frame of the machine. The shaft of roller 8 is designated 112ᵇ and thereon is keyed a spur gear wheel 112ᶜ adapted to mesh with a spur gear wheel 117ª so that roller 8 will be positively driven. Shaft 114 has a bearing in a frame 117 slidably supported on rods 121 projecting from the frame of the machine. On the outer ends of the rods 121 are provided nuts 122 which position springs 123 surrounding the rods 121 intermediate the same and the frame. In the frame 117 is slidably mounted a gear shifting arm 118 provided at one end with screw threads as at 119, and at its other end with a fork 124 extending at an angle thereto. On the arm 118 is slidably mounted a friction gear wheel 120 which is maintained in frictional engagement with one face of the gear wheel 106 by the springs 123. Said gear wheel 120 is mounted to rotate with the shaft 114 by means of the groove in the wheel, and the engagement therewith of a spline 125 on the shaft. Fork 124 loosely engages an annular groove in a collar on gear wheel 120 and the shifting arm 118 beyond the frame 117 is provided with screw threads engaged by a nut 126. By the rotation of gear wheel 106 and the frictional engagement of the gear wheel 120 therewith, such gear wheel 120 will be rotated and will accordingly rotate shaft 114, the bevel gears 112 and 113, and the feed rollers 7 and 8. By means of the arm and yoke connection with gear 120, through the rotation or turning of nut 126, the arm 118 may be moved relatively to the nut, to thereby move the gear wheel 120 to positions at different distances from the center of shaft 34, thereby varying the speed at which the parts, especially roller 7, are driven.

*Summary of the operation of the machine.*—The tubing from the loosely or rotatably mounted roller or roll 2, is passed over the roller 5 and then passed over the spreading device. To enable the tubing to be readily passed over the spreading device, the head or bracket 12 is removed or raised on or from the pins 11, the rollers 13 by abutment against the rollers 7 and 8, prohibiting the passage of the spreading device completely between the rollers 7 and 8, and thereby displacement thereof. The roller 7 being positively driven by the means described, will in turn impart its motion to the roller 8, and such rollers will feed or advance the tubing over the spreading and gripping device; the reduced or relatively thin rod 14' permitting the tubing to accumulate on said rod, the grooves 8' preventing binding of the tubing between the rollers and facilitating the passage of the tubing thereover. After the tubing has passed over the spreading and gripping device to the proper extent, the fingers 18 are spread by the engagement of the levers 42$^a$ therewith, whereby the tubing is spread. The tubing advancing, is gripped or engaged by the fingers 36 and 37 and carried beneath the cutters or knives 55 and 57. The operating parts of the machine are so timed and formed as to operate the levers 42$^a$ to spread the same, and thereby permit their disengagement from the ends 19 of the fingers, so that the fingers or spreading device simultaneously releases its hold upon the tubing upon the gripping of the tubing by the fingers 36 and 37. Said fingers 36 and 37, through the oscillatory movement of the arm 27, specifically its upward swing, moves or carries the tubing part way onto the holder and stretching gripping rods 69. The arm 27 is oscillated as previously stated, through the medium of shaft 34, pitman 29, crank 28 and shaft 26. Thereupon the proper parts of the machine operate to move the knife 57 past the knife 55 so as to sever or cut a length of tubing. The machine of course, operates to return the knife after such operation, to proper position preparatory to another cutting operation. As the tubing is carried upwardly on the rods 69, such rods are relatively close together. Upon the arm 27 reaching its upward limit, the lever 80 and wedge 78 are actuated through the medium of cam 83 to force the wedge 78 against the rollers 73 of the blocks 72 carrying the rods 69, thereby spreading such rods so that they will firmly stretch and hold the cut length of tubing.

As stated previously, the rods at the tubing engaging parts thereof, are preferably provided with emery or their surface is otherwise roughened so that they will effectively stretch and hold the tubing. After the arm 27 has reached its upward limit, the operating parts thereof return the same or start it on its downward swing. On such downward swing, the fingers 36 and 37 turn and fold or return the cut length of tubing from one end thereof, until both ends thereof are even and the tubing is double and formed into a cuff to be sewed or fastened to a garment. Simultaneously with the ends becoming even, the fingers 36 and 37 release the cuff by means of the engagement of studs 40 with the lugs 67. Simultaneously with such latter action, the wedge 78 is operated to move from between the blocks 72, by the spring 75 and rollers 13, which action restores or returns the rods 69 to close relation, the cuff then being loose upon the rods 69. During continued downward movement of arm 27, the crook 84 is brought into engagement or contacts with the cuff, thereby sliding or moving the same off the rods 69. It is clear that during continued movement of the arm 27 in the downward direction, that the studs 40 engage the lugs 68, thereby opening fingers 36 and 37 so that they will engage the slack or accumulated tubing or the spreading device. The cuffs after being moved off the rods 69, fall down chute 85 onto the paddle 90, which paddle is then operated through the medium of cam 33, lever 94, rod 93 and rod 89, to move or advance the cuff into the trough 86, the paddle after such movement, oscillating or returning to its normal position, the projections 100 preventing the cuff returning with the paddle. The cuffs accumulating in the trough 86 move the ones ahead of the same through said trough from which they can be moved into the removable trough section 87, from which they may be removed through operation of the false bottom 104, or by the removal and inversion of the trough section 87, it being obvious that the gate 105 is positioned to close the open end of the removable section 87 upon removal or discharge of cuffs from the trough section 87.

It is to be understood that merely the preferred embodiment of the invention has been illustrated and described, and that many and various changes in the details of construction of the various mechanisms or parts may be made or varied, within the spirit and scope of the appended claims.

Having thus described my said invention, what I claim as new and desire to secure by Letters Patent is:—

1. In a machine of the class described, roller means for material operated upon provided with a gear wheel, a shaft provided with a gear wheel in mesh with said gear wheel, a slidable gear wheel on said shaft, in combination with a driven member frictionally engaged by said slidable gear, and means to yieldingly maintain said slidable gear wheel in frictional engagement with said driven member, said latter means comprising a frame extending transversely of the shaft in which and through which said shaft is journaled, rod means on which said frame is slidably mounted, and spring means on said rod means exerting pressure against said frame to maintain said slidable gear in frictional engagement with the driven member.

2. In a machine of the class described, roller means for material operated upon provided with a gear wheel, a shaft provided with a gear wheel in mesh with said gear wheel, a slidable gear wheel on said shaft, in combination with a driven member frictionally engaged by said slidable gear, means to yieldingly maintain said slidable gear wheel in frictional engagement with said driven members, said latter means comprising a frame in which said shaft is journaled, rod means on which said frame is slidably mounted, spring means on said rod means exerting pressure against said frame, a shaft member for said slidable gear mounted in said frame, and a nut adjustable on said shaft member.

3. In a machine of the class described, cutter means, means to advance material to said cutter means, and means to spread said material during advancement to the cutter means having material-engaging members interior of the material, one member being movable relatively to the other member during said advancement.

4. In a machine of the class described, cutter means, means to advance material to said cutter means, means to spread said material during advancement to the cutter means having material-engaging members, one of said members movable relatively to the other member during said advancement, and means to release said spreading means preparatory to engagement by the advancing means.

5. In a machine of the class described, means for the spreading of material having an elongated rod and material spreading fingers of less length than the rod at the discharge end of the rod to provide for accumulation of material on the rod in advance of the fingers, said fingers adapted to normally assume a position out of spreading relation with the material, and means operating to spread the fingers at predetermined times, whereby the fingers operate to alternately spread and release the material so that the material may accumulate on the said rod and then be spread and subsequently the spread material advanced without interference by the spreading fingers.

6. In a machine of the class described, means for the spreading of material having a rod, material spreading fingers pivoted with respect to the rod intermediate the ends of the fingers, yieldable means to normally maintain the fingers adjacent their inner ends in contact with the rod and means movable relatively close to the rod engageable with said fingers adjacent their inner ends to spread the fingers at predetermined times, whereby the fingers operate to alternately spread and release the material so that the material may accumulate on the rod and then be spread, and subsequently the material advanced without interference by the spreading fingers.

7. In a machine of the class described, means for the spreading of material having a rod, a guide member at the receiving end thereof to initially spread material, and movable spreading means for the material supported from the rod adjacent the discharge end of the rod, the rod having a portion intermediate said guide member and the movable spreading means forming means for the accumulation of material in advance of the movable spreading means.

8. In a machine of the class described, abutment means, spreading means for material operated upon comprising a device having a rod, a roller to engage said abutment means, a bracket slidable on said rod, a bar fixed on said rod, a spring surrounding said rod intermediate said bracket and bar, material spreading fingers pivoted to said bar, links pivoted to said fingers and to said bracket, and means to spread said fingers.

9. In a machine of the class described, abutment means, a spreading device for material provided with a guide member, a roller to engage said abutment means, a rod, a bracket slidable on said rod, links pivoted to said bracket, spreading fingers for the material pivoted to said links, a bar fixed to said rod, said fingers pivoted to said bar, a coil spring surrounding said rod and interposed between said bracket and bar, said fingers having ends extending toward said rod, and spreading means for the fingers engageable with said ends.

10. In a machine of the class described, material spreading means having two spreading elements, one element movable relatively to the other element, means separate from said elements to maintain said movable element in spreading relation with the material, means to actuate said second means at predetermined times to permit movement of the movable element out of spreading relation with the material, whereby the said elements operate to alternately spread and release the material so that the material may accumulate on the spreading means and the spread material may be advanced without interference by the movable spreading element, and means to positively advance the material when said movable element is out of spreading relation with the material.

11. In a machine of the class described, material spreading means, shifting means, said shifting means being separate from and engageable with said spreading means at predetermined times to move the said spreading means into spreading relation with the material, said shifting means adapted to move laterally with respect to the spreading means after a spreading operation to permit movement of the spreading means out of spreading relation with the material, whereby the spreading means operate to alternately spread and release the material so that the material may accumulate on the spreading means and the spread material may be advanced without interference by the spreading means.

12. In a machine of the class described, in combination, material spreading means having material engaging fingers, one finger being movable relatively to the other finger, and power driven means including a lever separate from the fingers operable in a plane transversely of the fingers, alternately movable first into the path of said movable finger to engage the movable finger to maintain it in spreading relation with the material, and second, to move said lever out of engagement with said movable finger to permit the same to move out of spreading relation with the material, whereby the fingers operate to alternately spread and release the material comprising a lever separate accumulate on the spreading means and the spread material may be advanced without interference by the fingers.

13. In a machine of the class described, in combination with material spreading means, means operable at predetermined times to actuate said spreading means to release the material comprising a lever separate from the spreading means, a second lever, means to actuate said second lever and means connecting said second lever and first lever to actuate the first lever through movement of the second lever, whereby the spreading means operates to alternately spread and release the material so that the material may accumulate on the spreading means and the spread material may be advanced without interference by the spreading means.

14. In a machine of the class described, in combination with material spreading means, means to operate the spreading means alternately into and out of spreading relation with material to alternately spread and release the material so that the material may accumulate on the spreading means and the spread material may be advanced without interference by the spreading means, comprising a plurality of co-acting levers, means to shift said levers, and spring means for normally maintaining said levers spread apart.

15. In a machine of the class described, material spreading means, means for operating said spreading means into and out of spreading relation with material comprising a plurality of levers, an operating lever, a link pivoted to said operating lever and to one of said plurality of levers, a link pivoted to said operating lever and to the other of said plurality of levers, and spring means connected to said operating lever for normally maintaining said levers spread apart.

16. In a machine of the class described, in combination with material spreading means, means to operate said spreading means into and out of spreading relation with material comprising a plurality of levers, an operating lever, links pivoted to said operating lever and said plurality of levers, guide means for said operating lever, spring means fastened to said operating lever for normally maintaining the levers spread apart, a cam arranged in operative relation to said operating lever, and means to drive said cam.

17. In a machine of the class described, cutter means for material operated upon, means to spread the material for engagement by the cutter means having co-acting material-spreading elements, one of said spreading elements being movable relative to the other spreading element during a spreading operation upon operation of the machine and means to alternately operate the said movable spreading element, first, for spreading of the material and, second, to a position permitting retraction of the said movable spreading element for release of the material in order to permit engagement of the material by means to advance the material across the cutter means.

18. In a machine of the class described, means to advance material through the machine comprising a swinging arm, angle arm means thereon projecting laterally on opposite sides thereof adjacent its free end, a plurality of gripping devices carried by said arm means, one on each of opposite sides of the swinging arm, each gripping device having a plurality of fingers, one finger of each device being fixed and the other finger of each device being pivoted relatively thereto, said latter fingers being pivoted to said angle arm means, and a connecting member for said fixed arms.

19. In a machine of the class described, means to advance material through the machine comprising an arm, gripper means carried by said arm, a shaft on which said arm is mounted, support means for said shaft, a crank arm on said shaft, a pitman connected to said crank arm, a cam to which said pitman is connected, and means to drive said pitman.

20. In a machine of the class described, means to advance material through the machine comprising a device having gripping fingers, one of said fingers movable relatively to the other finger, means to normally hold said fingers in closed relation, means to open said fingers so that they may engage the material located adjacent one extremity of the path of movement of the device, and second means to open said fingers so that they may release the material, said second means located adjacent the other extremity of the path of movement of the device, said second finger-opening means being adjustable relatively to the first finger-opening means for the purpose specified.

21. In a machine of the class described, means to advance material through the machine having a gripping device provided with gripping fingers, one of said fingers being pivoted, means normally maintaining said fingers closed, a stud pivoted on said pivoted finger, and means adjustably mounted on said machine in the path of movement of said stud adjacent the limit of its movement away from the material to engage the stud to thereby open said fingers.

22. In a machine of the class described, means to advance material through the machine having a gripping device, said device having a plurality of fingers, one of said fingers being pivoted, means to normally maintain said fingers closed, a stud pivoted to said pivoted finger, an arm on said stud to prevent movement thereof independently of the finger when acted upon from one direction, and means adjustably mounted on the machine in the path of movement of said stud adjacent the limit of its movement away from the material to engage said stud to thereby open said fingers.

23. In a machine of the class described, means for advancing material through the machine having a gripping device, said device having a plurality of fingers, one of said fingers being pivoted, a spring to normally maintain said fingers closed, a stud pivoted to said pivoted finger, an angle arm on said stud for the purpose specified, a spring to normally maintain said angle arm in contact with the pivoted finger, lugs to engage said stud, and bracket means on the machine supporting said lugs, one bracket located adjacent each limit of the path of movement of the gripping device, said brackets being adjustable relatively for the purpose specified.

24. In a machine of the class described, means for advancing material through the machine having a gripping device, said device having a plurality of fingers, one of said fingers being pivoted, means to normally maintain said fingers closed, a stud pivoted to said pivoted finger, an arm on said stud to prevent movement thereof independently of the finger when acted upon from one direction, means adjacent one limit of the path of movement of the device to engage said stud to thereby open the fingers, a bar on said machine, and means adjustably mounted on said bar to engage said stud to open said fingers by movement in one direction and to permit shifting of the stud by movement in the opposite direction to prevent opening of the fingers.

25. In a machine of the class described, cutter means, gripping and advancing means for tubing, spreading means for the tubing over which the same is moved by the gripping and advancing means, said tubing spreading means comprising spreading members movable in parallel relation laterally being relatively close together when engaged by the tubing, and means to move said members laterally away from each other after engagement by the tubing to effectively spread the same.

26. In a machine of the class described, a plurality of rods to spread tubing, brackets for said rods, guide means for said brackets, and movable means engageable intermediate said brackets to slide said brackets laterally relatively.

27. In a machine of the class described, spreading means for tubing comprising a plurality of rods, brackets for said rods, return spring means for said brackets, said brackets provided with a block dove-tail in cross section, guide means for said brackets, having slots engaged by said arms and shaped accordingly, and means to spread said arms apart and accordingly the rods to spread the tubing.

28. In a machine of the class described, spreading means for tubing comprising relatively movable spreading devices, means to slide said devices laterally in parallel relation comprising a movable wedge member, and means to actuate said wedge member.

29. In a machine of the class described, spreading means for material comprising relatively movable spreading devices, means to spread said devices comprising a wedge member, a lever for said wedge member, and means to actuate said lever.

30. In a machine of the class described, spreading means for tubing comprising relatively movable spreading devices, each device provided with a roller, means to spread said devices comprising a wedge operable intermediate and against the rollers, a lever on which said wedge member is mounted, and means to actuate said lever.

31. In a machine of the class described, means to cut tubing into lengths, spreading means for the cut lengths of tubing comprising spreading members movable laterally in parallel relation, means to grip said tubing and move the same on to said spreading means, means to slide said spreading means to effectively spread the tubing after its passage thereon, said means to slide the spreading means operable to release said spreading means while a cut length of tubing is engaged therewith, and means to bear against said cut length of tubing to remove the same from the spreading means.

32. In a machine of the class described, means to cut tubing into lengths, means to spread said cut lengths of tubing comprising relatively movable members, gripper means to advance the tubing over said members during movement of the gripper means in one direction, and operating means for the spreading means timed to operate to permit movement of said members to relatively close position upon the return or movement of the gripper means in an opposite direction.

33. In a machine of the class described, means to cut tubing into lengths, means to spread the cut lengths of tubing comprising relatively movable members, gripper means to advance the tubing over said movable members during movement in one direction, means timed to move said movable members relatively close together upon return or movement in an opposite direction of the gripper means, and means carried by said gripper means operating subsequent to movement of the movable members to close relation to engage the cut lengths of tubing on the movable members to slide the cut lengths off the same upon said return movement.

34. In a machine of the class described, spreading means for tubing comprising relatively movable parts, means to spread said parts, gripper means to advance the material onto the spreading means while in normal position and to fold said tubing while spread by said parts, and said means to spread said parts being timed to release the tubing after folding thereof.

35. In a machine of the class described, spreading means for tubing comprising relatively movable parts, gripper means to advance the material onto the spreading means while in normal position and to fold said tubing while spread by said parts, means to actuate said parts timed to operate to release the tubing after folding thereof, and means to positively remove said folded tubing from said spreading means subsequent to release by the spreading means.

36. In a machine of the class described, spreading means for tubing, gripper means to move said tubing onto said spreading means, actuating means for said spreading means, said actuating means adapted to operate the spreading means after movement of the tubing onto the spreading means and to maintain the spreading means in spreading relation with the tubing during movement of the gripper means, said actuating means being operable to permit retraction of the spreading means, and means to remove said tubing from said spreading means subsequent to retraction of the spreading means.

37. In a machine of the class described, a plurality of laterally movable spreading members, and means to move said members into and out of relative close position before spreading and release, respectively, of material operated on, said means having a cam, mechanism to drive the cam, and means coöperating with said cam and with said spreading members to directly move said members through the action of the cam.

38. In a machine of the class described, cutter means, means to advance material thereto for cutting, means to spread material after cutting comprising a plurality of laterally movable spreading members, and means tending to maintain said members in relatively close relation, said means to spread the material being inoperative prior to and during partial reception of material to facilitate engagement of the material with the spreading members, and said means tending to maintain the spreading members in relatively close relation, operating to move the spreading members into relatively close relation while the spreading means is inoperative prior to and during partial reception of the material.

39. In a machine of the class described, a trough into which the products are discharged having side walls, each wall being provided with a longitudinally arranged row of interiorly extending projections to be successively engaged by the products upon accumulation in the trough to maintain the product in an upstanding position, and a pivoted paddle operable in said trough to advance the products discharged therein.

40. In a machine of the class described, a trough into which the products are discharged having side walls, each wall being provided with a longitudinally arranged row of interiorly extending projections to be successively engaged by the products upon accumulation in the trough to maintain the product in an upstanding position, said trough having a bottom provided with a curved portion having an opening therein, and a pivoted paddle device extending through said opening having a paddle operable in said trough over said curved portion to advance the products discharged therein, and means to operate said paddle.

CLARETT BIRDELL GREESON.

Witnesses:
 C. H. TERRIL,
 M. K. BARNES.

Copies of this patent may be obtained for five cents each, by addressing the "Commissioner of Patents, Washington, D. C."